(12) United States Patent
Enterline

(10) Patent No.: US 6,196,515 B1
(45) Date of Patent: Mar. 6, 2001

(54) LOAD EQUALIZATION SUPPORT SYSTEM

(75) Inventor: David L. Enterline, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/391,083

(22) Filed: Sep. 7, 1999

(51) Int. Cl.$^7$ .................................................. F16M 13/00
(52) U.S. Cl. ...................... 248/550; 248/188.3; 248/631; 248/638; 267/136
(58) Field of Search ..................... 248/394, 550, 248/562, 636, 371, 188.3

(56) References Cited

U.S. PATENT DOCUMENTS

| | | | |
|---|---|---|---|
| 5,180,127 | * | 1/1993 | Klose ................. 248/188.3 |
| 5,285,995 | * | 2/1994 | Gonzalez ............. 248/550 |
| 5,356,110 | * | 10/1994 | Eddy .................. 248/550 |
| 6,022,005 | * | 2/2000 | Gran .................. 248/550 |

* cited by examiner

*Primary Examiner*—Alvin Chin-Shue
(74) *Attorney, Agent, or Firm*—Kenneth W. Float

(57) ABSTRACT

A support system employing a load equalizing floating platform. The support system comprises four jacks 30 including opposed pairs of jacks for coupling to four respective supports. Each jack has a support rod with upper and lower pressure plates attached thereto that are disposed in a cavity to form first, second, third and fourth pressure chambers. Each of the first pressure chambers of all jacks are coupled together. Also, the respective second pressure chambers of jacks are coupled to the opposite jack third pressure chambers. Each of the fourth pressure chambers of all jacks are coupled together. The load equalizing floating platforms equalizes support forces and prevents rotation of the support system due to overturning moments at all support points. The system eliminates stresses and deformations in structures due to unequal support movement. The system may be used to support antenna reflector structures, large telescope mirrors and other structures where support movement or moment loads can degrade performance or function.

4 Claims, 4 Drawing Sheets

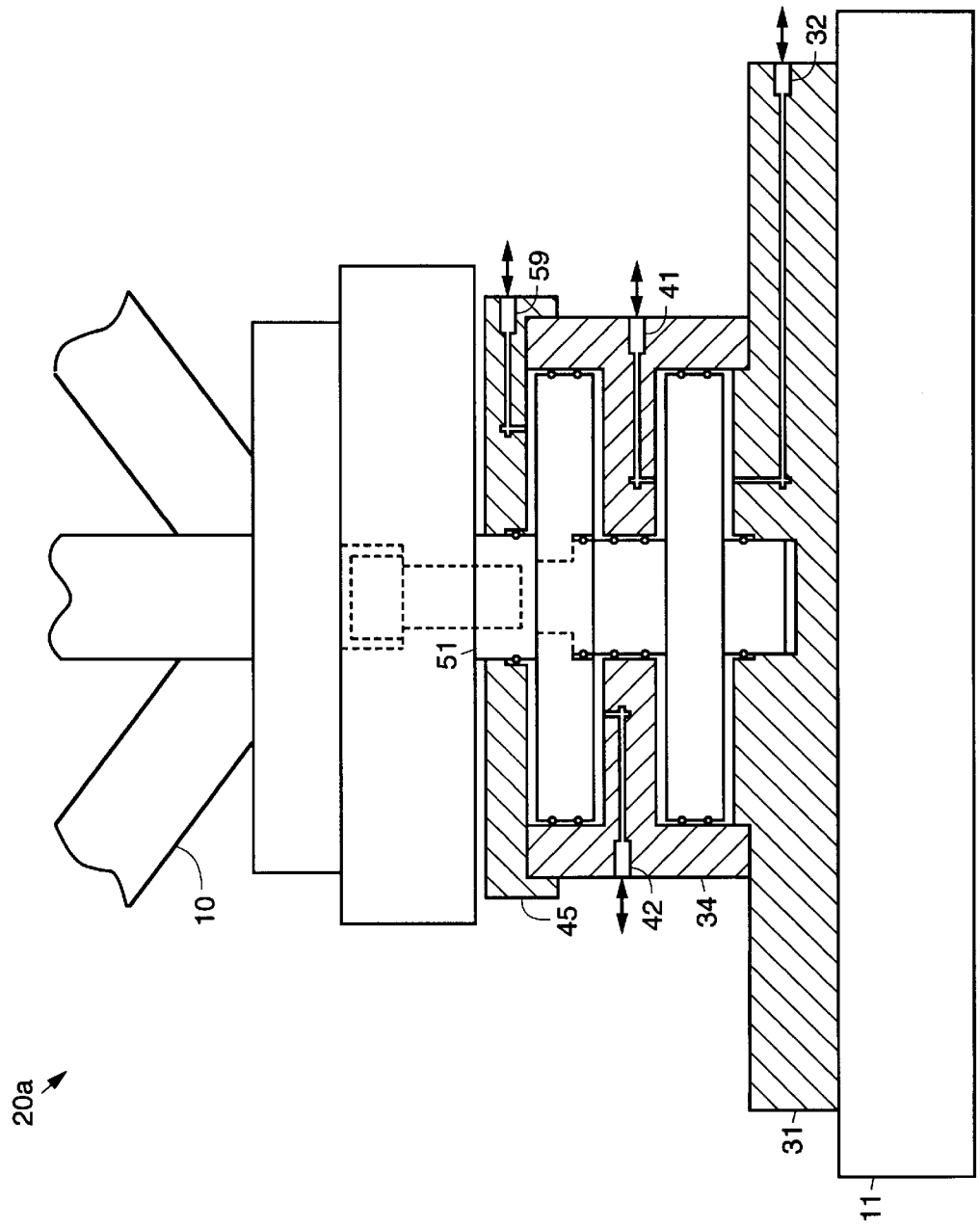

LOAD EQUALIZATION SUPPORT SYSTEM

BACKGROUND

The present invention relates generally to support systems for use with antennas and telescopes, and the like, and more specifically to a support system employing a load equalizing floating platform that eliminates distortions from support structure or foundation settlement, equalizes support forces and prevents rotation of the support system due to overturning moments at all support points.

Existing telescopes use a floating support system for primary mirrors and three hard defining points to stabilize rotation and carry overturning moments. Such prior art support systems allow structure distortion because they only support moments at the three hard defining points. The present invention allows all of the support points to resist moments and prevent distortion while still equalizing the support vertical loads.

Accordingly, it is an objective of the present invention to provide for a support system employing load equalizing floating platform that eliminates distortions from support structure or foundation settlement, equalizes support forces and prevents rotation of the support system due to overturning moments at all support points.

SUMMARY OF THE INVENTION

To accomplish the above and other objectives, the present invention provides for an improved support system comprising a load equalizing floating platform. An exemplary support system comprises four jacks including opposed pairs of jacks for coupling to four respective supports. Each jack comprises a support rod having upper and lower pressure plates attached thereto that are disposed in a cavity to form first, second, third and fourth pressure chambers. Each of the first pressure chambers of all jacks are coupled together. Also, the respective second pressure chambers of the jacks are coupled to the third pressure chambers of the opposed jacks. Each of the fourth pressure chambers of all jacks are coupled together. Additional pairs of jacks may be added to the support system.

There is no requirement that the support system be symmetric, or that the center of gravity or the center of loading be at the center of the support system. However, a minimum of two pairs of jacks (4 jacks) are needed. Also, for any in-plane orthogonal axis pair through the center of area of the jacks, the cross sectional areas for all coupled chambers should be substantially equal on opposite sides of etch axis.

The load equalizing floating platform equalizes the support forces and prevents rotation of the support system due to overturning moments at all support points. The hard defining points employed in prior art support systems are not needed or used in the present system.

The present invention eliminates stresses and deformations in symmetric structures due to unequal support movement. The present invention is useful for antenna reflector structures, large telescope mirrors and other structures where support movement or moment loads can degrade performance or function.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 illustrates details of one support location of an exemplary support system in accordance with the principles of the present invention.

DETAILED DESCRIPTION

Figure 1:
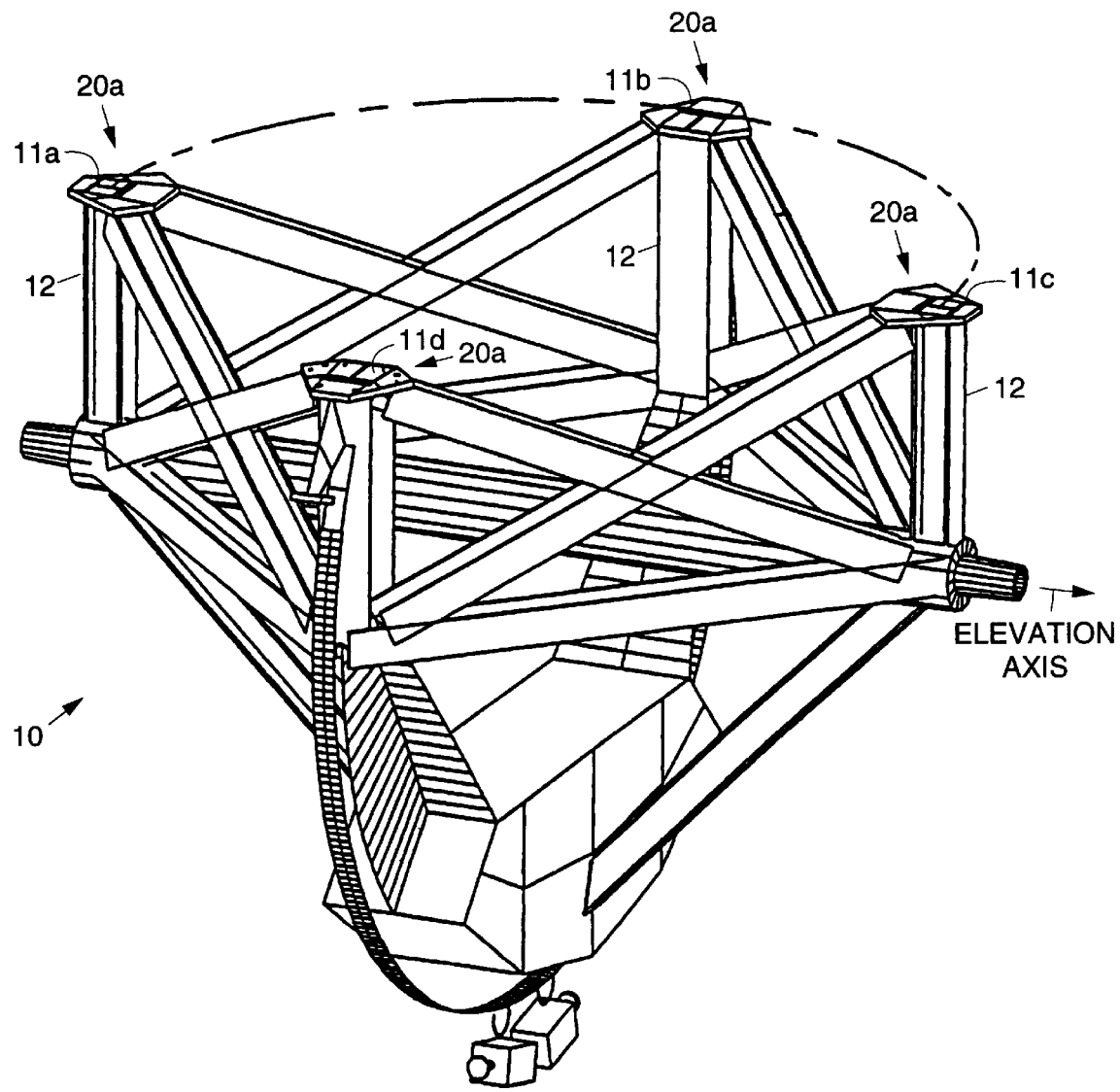
FIG. 1 illustrates a reflector antenna rotating support structure having a four point interface to a support system in accordance with the principles of the present invention.

Referring to the drawing figures, FIG. 1 illustrates a reflector antenna rotating support structure 10 having an exemplary four point interface 20a to a support system 20 (FIG. 3) in accordance with the principles of the present invention. The reflector antenna rotating support structure 10 is used to rotate a reflector antenna, for example, about an elevation axis shown by the arrow at the right side of FIG. 1. The four point interface 20a has four pads 11a, 11b, 11c, 11d at ends of four supports 12 to which the present support system 20 is structurally connected.

Figure 2A:
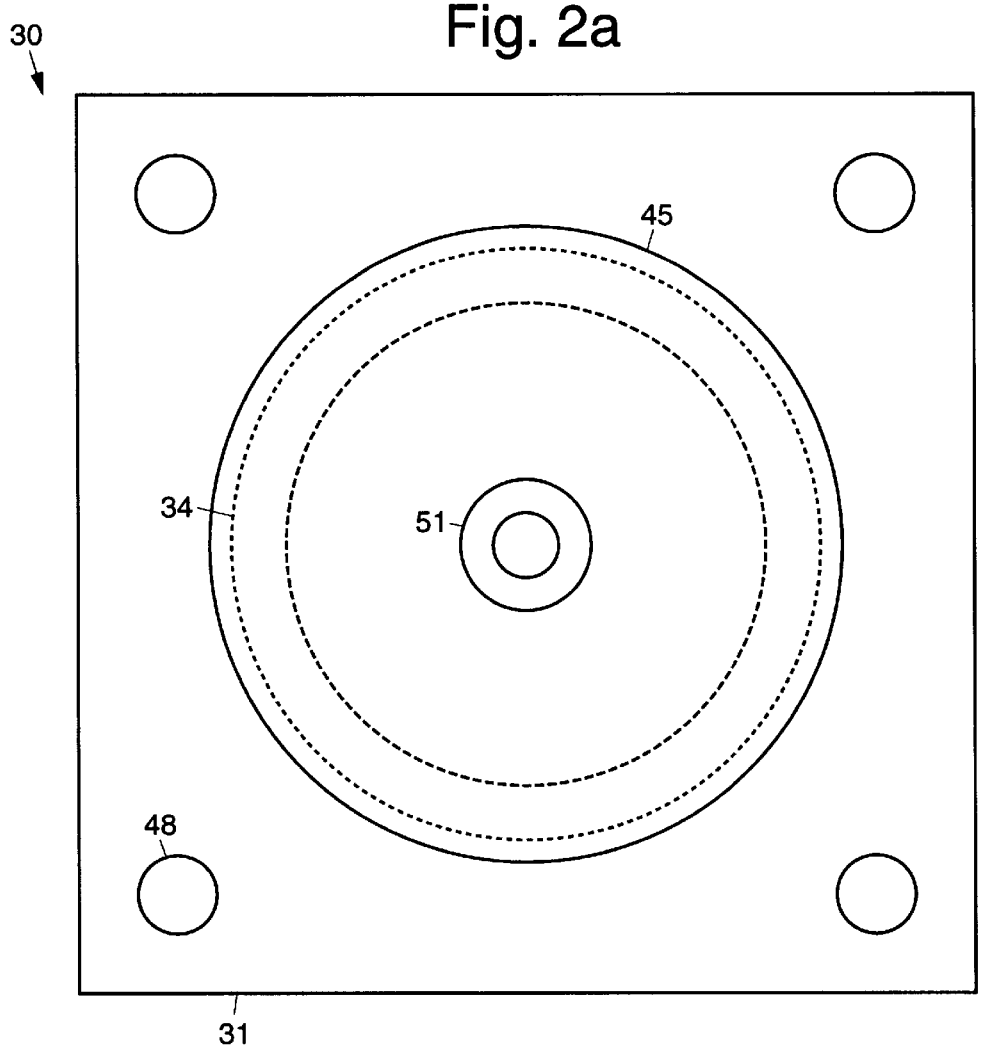
FIGS. 2a and 2b illustrate top and cross sectional side views, respectively, of an exemplary hydraulic jack employed in a support system in accordance with the principles of the present invention.
Figure 2B:
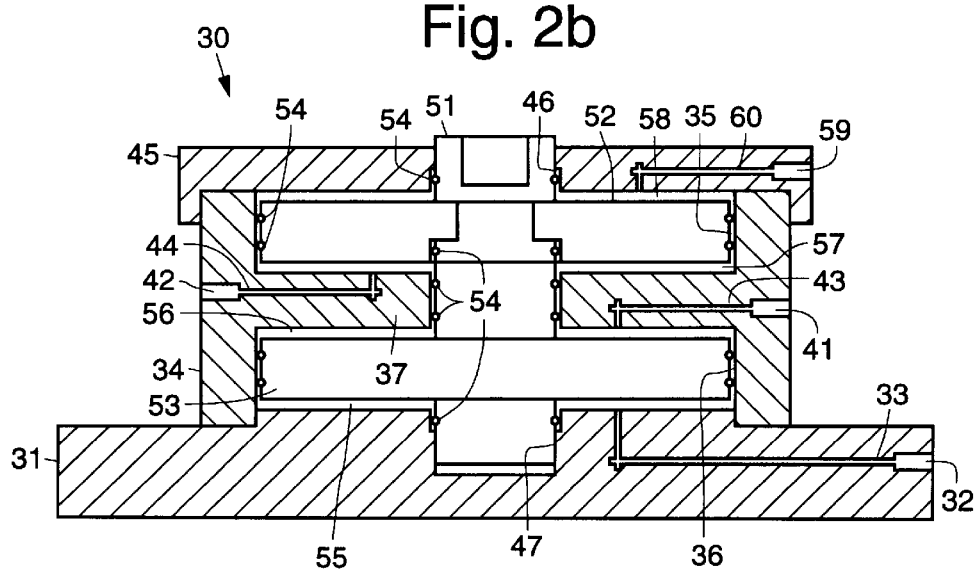

FIGS. 2a and 2b illustrate top and cross sectional side views, respectively, of an exemplary hydraulic jack 30 that forms a load equalizing floating platform 30 that is employed in the support system 20. The support system 20 employs a plurality of such hydraulic jacks 30 and is used to support the reflector structure, for example. The support system 20 and hydraulic jacks 30 may be used to support an antenna or radio telescope reflector structure, as manufactured by the assignee of the present invention, and to support primary mirrors of telescopes, and the like.

A typical antenna reflector four point support system 20 is used on a 46-foot diameter antenna, such as is shown in FIG. 1, for example. Such a four point support system 20 experiences non-symmetric axial deflections and non-planer rotations that distort the reflector. The support system 20 eliminates this type of support movement and improves the antenna surface accuracy performance. The jack 30 shown in FIGS. 2a and 2b is used at the four support points for the reflector.

As is shown in FIGS. 2a and 2b, the jack 30 comprises a base plate 31 having a first port 32 and first channel 33 disposed therein. A cylinder housing 34 is attached to the base plate 31. The cylinder housing 34 has an H-shaped cross section that forms upper and lower cavities 35, 36 separated by a central portion 37.

The cylinder housing 34 has second and third ports 41, 42 and second and third channels 43, 44 disposed in its central portion 37. A cap plate 45 is attached to the cylinder housing 34 distal from the base plate 31 to seal the cylinder housing 34 and hence the interior of the jack 30. The cap plate 45 has the fourth port 59 and channel 60 disposed therein.

The cap plate 45 has a central opening 46 therein. The base plate 31 has a central cylindrical cavity 47 formed therein that opens to the interior of the cylinder housing 34. A support rod 51 extends through the central opening 46 in the cap plate 45 and into the central cylindrical cavity 47 in the base plate 31. Upper and lower pressure plates 52, 53 are attached to the support rod 51 and are respectively disposed in the upper and lower cavities 35, 36 in the interior of the cylinder housing 34.

A plurality of O-ring seals 54 provide a seal between the upper and lower pressure plates 52, 53 and an interior wall of the cylinder housing 34, between the support rod 51 and the central portion 37 of the cylinder housing 34, between the support rod 51 and the central cylindrical cavity 46 of the cap plate 45 and between the support rod 51 and an interior wall of the central cylindrical cavity 47 of the base plate 31.

First, second, third and fourth pressure chambers 55, 56, 57, 58 are respectively formed between the base plate 31 and the lower pressure plate 53, between the lower pressure plate 53 and the central portion 37 of the cylinder housing 34, between the central portion 37 of the cylinder housing 34 and the upper pressure plate 52 and between upper pressure plate 52 and the cap plate 45. The first, second, third and fourth channels 33, 43, 44, 60 are coupled between the respective ports 32, 41, 42, 59 and the first, second, third and fourth pressure chambers 55, 56, 57, 58 and allow passage of hydraulic fluid into and out of the respective chambers 55, 56, 57, 58. A second set of ports 32, 41, 42, 59 and channels identical to the first ports and channels but clocked at a rotated, out of view, position allow for bleeding air from the system. The second set of ports are normally plugged.

Figure 3:
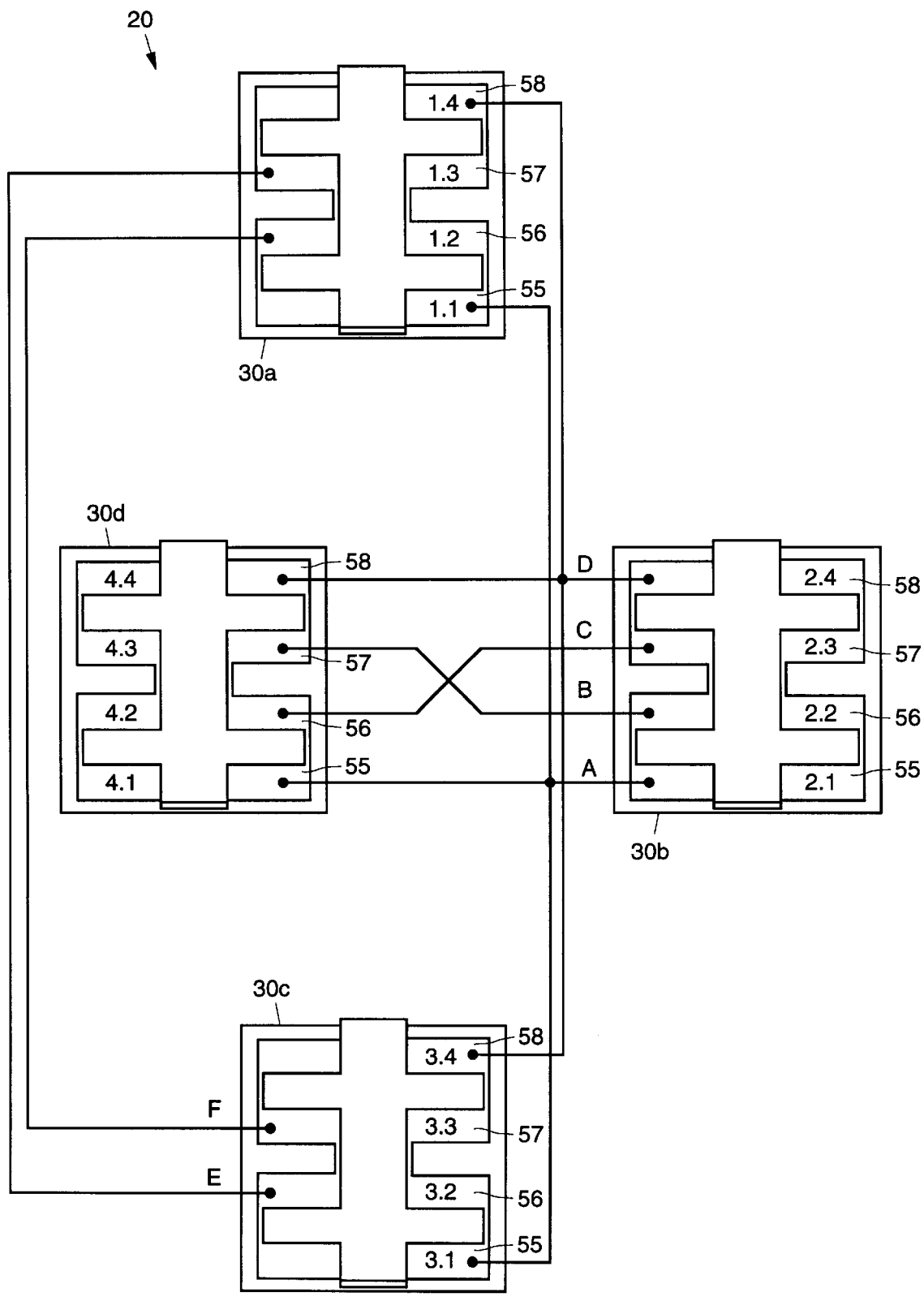
FIG. 3 illustrates a control circuit diagram of an exemplary embodiment of the present support system.

Referring to FIG. 3, it illustrates a control circuit diagram of an exemplary embodiment of the support system 20. The exemplary support system 20 includes four jacks 30a, 30b, 30c, 30d, substantially as shown and described with reference to FIGS. 2a and 2b. The four jacks 30a, 30b, 30c, 30d are respectively disposed at the four pads 11a, 11b, 11c, 11d of the four point interface 20a shown in FIG. 1.

The respective jacks 30a, 30b, 30c, 30d have their pressure chambers 55, 56, 57, 58 coupled as shown. Each circuit is a closed system containing hydraulic fluid. Each of the first pressure chambers 55 of all jacks 30a, 30b, 30c, 30d are coupled together. The respective second pressure chambers 56 of the jacks 30a, 30c, 30b, 30d are coupled to the third chambers 57 of the opposed jacks 30a, 30b, 30c, 30d. Each of the fourth pressure chambers 58 of all jacks 30a, 30b. 30c, 30d are coupled together.

By connecting the pressure chambers 55, 56, 57, 58 of the jacks 30a, 30b, 30c, 30d in the manner shown in FIG. 3, a stable axial force and moment support system 20 is provided. Each jack 30a, 30b, 30c, 30d supports an axial load and a lateral load. Lateral forces at top of the support rod 51 are reacted by forces at the cap plate 45 central opening 46 and at the base plate 31 central opening 47. This is illustrated in FIG. 4, which shows details of one support location of an exemplary support system 20. More specifically, FIG. 4 shows connection between one of the jacks 30 and its corresponding interface pad 11 of the four point interface 20a.

Symmetric loading and displacements that occur in the system 20 of FIG. 3 will now be discussed. Circuit A (interconnecting the respective first pressure chambers 55 of all jacks 30a, 30b, 30c, 30d) and circuit D (interconnecting the respective fourth pressure chambers 58 of all jacks 30a, 30b, 30c, 30d) supports the symmetric loads exerted by the structure and insures symmetric displacement for any movement in the supports 12. Since the first chambers 55 and fourth chambers 58 of all four jacks 30 are connected together, they provide equal force to any symmetric load. If one or more of the supports 12 moves in an axial direction, the reflector structure 10 also moves in the axial direction to equalize the pressure.

For example, if the first and third jacks 30a, 30c (first opposed pair of jacks 30) located at the elevation wheel support 12 deflect downward due to a gravity load 0.010 inches more than the second and fourth jacks 30b, 30d (second opposed pair of jacks 30), then the reflector structure 10 moves downward 0.005 inches equally at each support 12 to equalize the load at each jack 30. Circuits B, C, E and F (interconnecting the respective second and third pressure chambers 56, 57 of the jacks 30a, 30b, 30c, 30d as described above) are cross-connected and do not respond to axial force or support displacement. The chambers 55 and 58 of all four jacks provide a double acting jack system that resists loads by positive pressure on the hydraulic fluid.

Asymmetric loading and displacements that occur in the system 20 of FIG. 3 will now be discussed. Reflector moment loads are reacted at the supports 12 by asymmetric forces (force couples). Circuits A and D interconnects the respective first and fourth pressure chambers 55 and 58 of all jacks 30a, 30b, 30c, 30d and cannot resist this type of load. Circuits B and C (cross coupling the second and third pressure chambers 56, 57 of the second opposed pair of jacks 30b, 30d) resist moments about the elevation axis. The first opposed pair of jacks 30a, 30c do not resist this moment but do move with support deformations to allow for planer support point movement. Without the jack support system 20, the four supports 12 can deform in a non-planer manner. Circuits E and F (interconnecting the second and third pressure chambers 56, 57 of the first opposed pair of jacks 30a, 30c) perform the same function as circuits B and C, but in a cross-elevation axis direction. Thus, a unique axial force and moment stable support system 20 is provided. The chamber 56 and 57 of all four jacks provide a double acting jack system that resists loads by positive pressure on the hydraulic fluid.

Force controlled support systems using interconnected first pressure chambers 55 such as provided by circuit A have been used before on a three-meter telescope located at the University of Hawaii. However, with regard to the present support system 20, it employs jacks 30 having four pressure chambers 55, 56, 57, 58 and interconnects these pressure chambers 55, 56, 57, 38 in a unique way to provide for a reflector structure 10 having reduced support distortion.

There is no requirement that the support system 20 be symmetric, or that the center of gravity or the center of loading be at center of the support system 20. However, a minimum of two pairs of jacks 30 (4 jacks) are needed. Also, for any in-plane orthogonal axis pair through the center of area of the jacks, the cross sectional areas for all coupled chambers 55, 56, 57, 58 should be substantially equal on opposite sides of each axis.

Thus, an improved support system employing load equalizing floating platform that equalizes support forces and prevents rotation of the support system due to overturning moments at all support points has been disclosed. It is to be understood that the above-described embodiment is merely illustrative of some of the many specific embodiments that represent applications of the principles of the present invention. More than four supports using any even number of jacks may be added to the system. Clearly, numerous and other arrangements can be readily devised by those skilled in the art without departing from the scope of the invention.

What is claimed is:

1. A support system comprising:
   four jacks comprising opposed pairs of jacks for coupling to four respective supports, each jack comprising:
   a support rod having upper and lower pressure plates attached thereto that are disposed in a cavity to form first, second, third and fourth pressure chambers wherein each of the first pressure chambers of all jacks are coupled together, the respective second pressure chambers of the jacks are coupled to the third pressure chambers of the opposed jacks and the fourth pressure chambers of all jack are coupled together.

2. The support system recited in claim 1 wherein each jack further comprises:

a base plate having a first port and first channel disposed therein;

a cylinder housing attached to the base plate; and a cap plate attached to the cylinder housing distal from the base plate;

and wherein the support rod extends through the cap plate and into the cylinder housing.

3. The support system recited in claim 2 wherein each jack further comprises upper and lower pressure plates attached to the support rod that are respectively disposed in upper and lower cavities formed within the cylinder housing.

4. The support system recited in claim 1 further comprising additional pairs of jacks.

* * * * *